United States Patent [19]

Hejno et al.

[11] 3,919,260

[45] Nov. 11, 1975

[54] 9-(2-TETRAHYDROFURYL)-2-NONENOIC ACID AND 9-(2-TETRAHYDROFURYL)-2,4-NONADIENOIC ACID AND ESTERS

[75] Inventors: Karel Hejno; Karel Slama; Frantisek Sorm, all of Prague, Czechoslovakia

[73] Assignee: Ceskoslovenska akademie ved, Prague, Czechoslovakia

[22] Filed: Oct. 29, 1974

[21] Appl. No.: 518,843

Related U.S. Application Data

[62] Division of Ser. No. 421,245, Dec. 3, 1973, abandoned.

[52] U.S. Cl.... 260/347.4; 260/243 B; 260/247.7 G; 260/347.3; 260/347.8; 260/469; 260/515 M; 71/246; 71/248; 71/285
[51] Int. Cl.² ............... C07D 307/28; C07D 307/36
[58] Field of Search .............................. 260/347.4

[56] References Cited
UNITED STATES PATENTS
3,262,947  7/1966  Nakano et al. ............... 260/347.4

*Primary Examiner*—Harry I. Moatz
*Attorney, Agent, or Firm*—Donald W. Erickson

[57] ABSTRACT

Novel insect control agents which are unsaturated esters and amides characterized by a terminal tetrahydrofuryl group and the synthesis thereof.

6 Claims, No Drawings

9-(2-TETRAHYDROFURYL)-2-NONENOIC ACID AND 9-(2-TETRAHYDROFURYL)-2,4-NONADIENOIC ACID AND ESTERS

This is a division, of application Ser. No. 421,245, filed Dec. 3, 1973, now abandoned.

The present invention relates to juvenile-hormone-like insecticide and manufacturing process thereof.

In the present time, there are known numerous substances possessing the insect juvenile hormone activity. The naturally occurring juvenile hormone has been isolated by Roller and coworkers from *Platysamia cecropia*. The juvenile hormone exerts a marked influence on the larval development of insects, interferes with larval metamorphosis and is indispensable for maturation of eggs in adult females. Because of this activity, the juvenile hormone represents a potential insecticide with great perspectives in the control of insects.

Substances, the preparation and use of which in the control of insects is disclosed in the present invention, represent novel analogues of the juvenile hormone. In their preparation furfural is used as the cheap and readily accessible starting material.

The present invention relates to a juvenile-hormone-like insecticide, the active component of which is represented by novel derivatives of 3,7-dimethyl-9-(2-tetrahydrofuryl)-2-nonenoic acid or 3,7-dimethyl-9-(2-tetrahydrofuryl)-2,4-nonadienoic

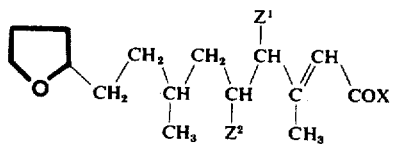

wherein $Z^1$ is hydrogen or, together with $Z^2$, a double bond,
$Z^2$ is hydrogen or, together with $Z^1$, a double bond,
X is a —$OR^1$ or —$N(R^2)R^3$ group in which $R^1$ is hydrogen or an alkyl group consisting of 1-5 carbon atoms, preferably methyl, ethyl or isopropyl, and $R^2$, $R^3$ is hydrogen or an alkyl group consisting of 1-5 carbon atoms or, together with a nitrogen atom, a five membered or six membered heterocyclic residue which may contain an additional heteroatom, preferably oxygen or sulfur.

The present invention relates also to a manufacturing process of novel derivatives of 3,7-dimethyl-9-(2-tetrahydrofuryl)-2-nonenoic acid or 3,7-dimethyl-9-(2-tetrahydrofuryl)-2,4-nonadienoic acid according to the general formula I, which process comprises treatment of the carbonyl compound according to the general formula II

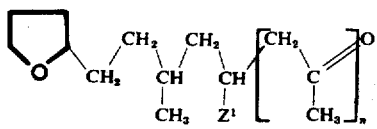

wherein n is 1 or zero, and
$Z^1$ is hydrogen (when n = 1) or a double bond extending to the oxygen atom (when n = 0), either with a phosphorane according to the general formula III

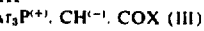

wherein

Ar is a low aryl, preferably phenyl, and
X is a -$OR^1$ group, in which $R^1$ is the same as in the formula I, in a nonpolar solvent, preferably benzene, toluene or xylene, at the boiling point temperature and under catalysis of a weak acid, preferably benzoic acid, or with a phosphonate according to the general formula IV

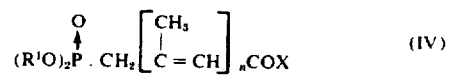

wherein n is 1 or zero, and
$R^1$, X are the same as in the formula I, in the medium of alcohols $R^1OH$ (wherein $R^1$ is the same as in the formula I), dimethylformamide, dimethyl sulfoxide, 1,2-dimethoxyethane, tetrahydrofuran or dioxane, and in the presence of bases such as sodium hydride or sodium and potassium alkoxides, preferably methoxides, ethoxides, tert-butoxides or 1,1-dimethylpropoxides. The juvenile-hormone-active compounds according to the general formula I thus prepared are then added to suitable liquid or solid carriers.

The starting 6-methyl-8-(2-tetrahydrofuryl)-2-octanone is prepared as follows. The pressure hydrogenation of furfurylideneacetone over Raney nickel in ethanol affords a fair yield of 4-(2-tetrahydrofuryl)-2-butanol. The latter compound is oxidized with chromium trioxide in acetone to afford 4-(2-tetrahydrofuryl)-2-butanone. The reaction of the latter compound with diethyl ethoxycarbonylmethanephosphonate affords ethyl 3-methyl-5-(2-tetrahydrofuryl)-2-penten-1-oate. Catalytic hydrogenation of the latter compound over palladium on active charcoal affords ethyl 3-methyl-5-(2-tetrahydrofuryl)-1-pentanoate. The lithium aluminium hydride reduction of the latter ester affords 3-methyl-5-(2-tetrahydrofuryl)-1-pentanol. The reaction of the latter alcohol with triphenylphosphine dibromide affords 1-bromo-3-methyl-5-(2-tetrahydrofuryl)pentane. The reaction of the latter compound with ethyl acetoacetate and the subsequent ketonic cleavage affords the required 6-methyl-8-(2-tetrahydrofuryl)-2-octanone.

The reduction of ethyl 3-methyl-5-(2-tetrahydrofuryl)-1-pentanoate to 3-methyl-5-(2-tetrahydrofuryl)-1-pentanal is performed with the use of bis(2-methoxyethoxy) sodium aluminium hydride at −75°C.

The insect juvenile hormone activity was tested as usual (cf. K. Sláma, Ann. Rev. Biochem. 40 (1971), p. 1079–1102) on representatives of several insect families.

The test substances were applied topically in 1 microliter of acetone as solvent to the freshly molted larvae of the last instar or to the freshly molted pupae. The activity was evaluated on the basis of metamorphosis inhibition, i.e., according to the degree of morphological change. The activity data in Table 1 are expressed in ID-50 Morph. units; these data represent such an amount of the test substance in micrograms per specimen that caused formation of half-larval or half-pupal (Tenebrio) adultoids.

TABLE 1

| Family<br>Species<br>Stage | Pyrrhocoridae<br>Dysderous<br>cingulatus<br>larva | Pentatomidae<br>Graphosoma<br>italicum<br>larva | Tenebrionidae<br>Tenebrio<br>molitor<br>pupa |
|---|---|---|---|
| Compound I*a* | 3 | 40 | 50–100 |
| I*b* | 5 | 3 | 40 |
| I*c* | 0.4 | 1 | 50 |
| I*d* | 0.1 | 5 | 1 |
| I*e* | 0.7 | 0 | 0.04 |
| I*f* | 0.5 | 0 | 1 |
| I*g* |  | 6 | 0.8 |

(For the chemical designations of compounds I*a*–*g* see Examples)

As it may be seen from Table I, the novel substances according to the present invention exhibit a significant juvenile hormone activity on representatives of both the main groups of pterygotal insect, namely, on Exopterygota (Dysdercus, Graphosoma) as well as on Endopterygota (Tenebrio). As shown by additional tests, some of the substances according to the present invention exhibit a high activity or a selective activity on Lepidoptera, Orthoptera and some other insects. The novel substances not only affect the insect metamorphosis but also mimic the juvenile hormone activity in respect to reproduction and embryonal development. In other words, after application of the novel substances according to the present invention, the insect is incapable of reproducing.

The present invention is illustrated by the following Examples but is not limited thereto.

EXAMPLE 1

Preparation of 4-(2-tetrahydrofuryl)-2-butanone.-

4-(2-Tetrahydrofuryl)-2-butanol (84.01 g; 0.58 mol) is dissolved in 350 ml of acetone (stabilized towards oxidation). The solution is cooled down with iced water and then treated dropwise under vigorous stirring with the precooled oxidizing agent (prepared by dissolving 40.80 g of chromium trioxide in 175 ml of water and 35.5 ml of concentrated sulfuric acid) at the temperature below 20°C; the addition requires about 35 minutes. The yellow color of the upper layer disappears in the course of additional 30 minutes. Since according to the thin-layer chromatography on silica gel in 9:1 light petroleum-acetone the reaction mixture contains some unreacted 4-(2-tetrahydrofuryl)-2-butanol, it is necessary to treat the reaction mixture portionwise with some additional oxidizing agent (up to 30% of the original amount) until the yellow color of the upper layer persists. After 6 hours and 35 minutes, the excess oxidizing agent is removed by the addition of the exactly required amount of saturated aqueous sodium pyrosulfite (the yellow color of the upper layer disappears). The whole reaction mixture is then transferred into a separatory funnel. The lower layer is separated (deep green), extracted with light petroleum (100 ml), the extract added to the original upper layer, and the whole is shaken. The liquid separates into two layers. The lower layer is combined with the original lower layer and the material is extracted with two 100-ml portions and one 50-ml portion of light petroleum. These extracts are combined with the original upper phase and washed with three 25-ml portions of saturated aqueous sodium chloride, two 20-ml portions of saturated aqueous sodium hydrogen carbonate, and then repeatedly with saturated aqueous sodium chloride until neutral, and finally dried over magnesium sulfate. The washings are extracted three times with ether, the combined ethereal extracts are washed with saturated aqueous sodium chloride until neutral, and dried over magnesium sulfate. Both the extracts are evaporated, the residues are combined and distilled under diminished pressure to afford 57.32 g (69.2% of the theoretical amount) of 4-(2-tetrahydrofuryl)-2-butanone, b.p. 87.5°–94.5°C at 11 torr.

Preparation of Ethyl 3-Methyl-5-(2-tetrahydrofuryl)-2-penten-1-oate.

4-(2-Tetrahydrofuryl)-2-butanone (56.88 g; 0.40 mol) and diethyl ethoxycarbonylmethanephosphonate (94.16 g; 0.42 mol) is dissolved in absolute ethanol (350 ml). The resulting solution is treated dropwise over 90 minutes with stirring under argon and occasional cooling with cold water with ethanolic sodium ethoxide (prepared from 9.66 g i.e. 0.42 gramatom of sodium and 240 ml of absolute ethanol); the temperature of the reaction mixture should not exceed 30°C. The reaction mixture is stirred at room temperature for an additional one hour and then kept at room temperature for 20 hours. The ethanol is removed under diminished pressure on a rotatory evaporator at the bath temperature below 30°C. The residue is poured into water pre-acidified with acetic acid and the product is extracted 4 times with light petroleum. The extracts are combined, washed successively with water, 1N potassium hydrogen carbonate, water till neutral, and saturated aqueous sodium chloride, dried over magnesium sulfate, and evaporated. The residue is distilled under diminished pressure to afford 2.04 g (2.4% of the theoretical amount) of the forrun, b.p. 89.5°C at 0.006 torr, and 78.50 g (92.45% of the theoretical amount) of ethyl 3-methyl-5-(2-tetrahydrofuryl)-2-penten-1-oate, b.p. 89.5°–102.5°C at 0.006 torr.

Preparation of Ethyl 3-Methyl-5-(2-tetrahydrofuryl)-1-pentanoate.

Ethyl 3-methyl-5-(2-tetrahydrofuryl)-2-penten-1-oate (96.78 g; 0.456 mol) in pure 96% ethanol (150 ml) is hydrogenated over 4.56 g of 5% palladium on active charcoal catalyst at room temperature and at the one-meter water column overpressure until the hydrogen uptake ceases. The catalyst is filtered off and washed with hot ethanol. The filtrate and washing are combined and evaporated. Distillation of the residue under diminished pressure affords 88.16 g of a liquid, b.p. 72°C/0.2 torr - 94.5°C/0.1 torr, which is not chromatographically homogeneous (as shown by thin-layer chromatography on silica gel in 9:1 light petroleum - acetone). The liquid is therefore purified on 1700 g of partially deactivated (by the addition of 12% of water) silica gel (particle size, 60-120 micron) in 96:4 light petroleum - acetone. The pure chromatographic fractions are combined and distilled to afford 76.30 g (78.1% of the theoretical amount) of ethyl 3-methyl-5-( 2-tetrahydrofuryl)-1-pentanoate, b.p. 80°C/0.03 torr – 77.2°C/0.008 torr.

Preparation of 3-Methyl-5-(2-tetrahydrofuryl)-1-pentanol.

A mixture of lithium aluminium hydride (7.21 g; 0.19 mol) and absolute ether (430 ml) is refluxed under stirring for two hours and cooled down. The resulting agent is treated under stirring over one hour with a solution of ethyl 3-methyl-5-(2-tetrahydrofuryl)-1-pentanoate (67.85 g; 0.317 mol) and absolute ether (70 ml). The whole reaction mixture is then gently refluxed under stirring for 2 hours, cooled down, and decomposed by a successive dropwise addition of water (7.3 ml), 15% aqueous sodium hydroxide (7.3 ml) and water (21.9 ml) under vigorous stirring. The crystalline precipitate is collected with suction and washed thoroughly with ether. The filtrates are washed successively with 1N sulfuric acid, water, 1N potassium hydrogen carbonate, water till neutral, and saturated aqueous sodium chloride, dried over magnesium sulfate, and evaporated. Diatillation of the residue under diminished pressure affords 51.94 g (i.e., 95.2% of the theoretical amount) of 3-methyl-5-(2-tetrahydrofuryl)-1-pentanol, b.p. 102.15°–103.0°C/0.43 torr, along with a small forrun.

Preparation of
1-Bromo-3-methyl-5-(2-tetrahydrofuryl)-pentane.

A solution of 3-methyl-5-(2-tetrahydrofuryl)-1-pentanol (45.0 g; 0.261 mol) and triphenylphosphine (75.37 g; 0.287 mol) in absolute dimethylformamide (260 ml) is treated dropwise under argon over 70 minutes with 45.93 g (0.287 mol) of dry bromine at the temperature below 30°C. The reaction mixture is then stirred at room temperature for 1 hour and extracted with six portions of light petroleum. The extracts are combined and washed repeatedly with small amounts of water. The aqueous washings are combined with the original lower layer (remaining after extractions), diluted with a fivefold amount of ice-cold water, and shaken under cooling in ice-cold water to deposit triphenylphosphine oxide which is collected with suction and washed with water and light petroleum. The filtrates are extracted with light petroleum and the extract is washed with water till neutral. The two light petroleum extracts are combined, washed with saturated aqueous sodium chloride, dried over anhydrous magnesium sulfate, and evaporated under diminished pressure. Distillation of the residual bromide in vacuo would lead to decomposition. The crude bromide is thus poured into water and extracted exhaustively with light petroleum. The extracts are combined, washed with water, 1N potassium hydrogen carbonate, water till neutral, and saturated aqueous sodium chloride, dried over magnesium sulfate, and evaporated under diminished pressure. The residue is chromatographed on a column of partially deactivated (by the addition of 12% of water) silica gel (440 g; particle size, 60–120 micron) in 96:4 light petroleum-ether. The pure homogeneous chromatographic fractions are combined and cautiously evaporated under diminished pressure to afford 39.22 g (i.e., 63.8% of the theoretical amount) of 1-bromo-3-methyl-5-(2-tetrahydrofuryl)-pentane.

Preparation of
6-methyl-8-(2-tetrahydrofuryl)-2-octanone.

Ethanolic sodium ethoxide (prepared from 4.41 g i.e. 0.192 gramatom of sodium and 95 ml of absolute ethanol) is treated dropwise under stirring with ethyl acetoacetate (26.04 g; 0.2 mol) over 15 minutes and then with 1-bromo-3-methyl-5-(2-tetrahydrofuryl)-pentane (39.22 g; 0.167 mol) over 60 minutes. The reaction mixture is kept at room temperature overnight and then heated in an oil bath at 90°C for 9 hours under stirring. The mixture is then treated dropwise over 30 minutes with 10% aqueous sodium hydroxide (245 ml), heated at 90°C for additional 4 hours, cooled down, diluted with water, and extracted exhaustively with light petroleum. The extracts are combined, washed successively with 2N sulfuric acid, water, 2N potassium hydrogen carbonate, and water till neutral, dried over magnesium sulfate, and evaporated. Distillation of the residue in vacuo affords 5.97 g (i.e., 16.86% of the theoretical amount) of the forrun, b.p. 99.5°C/0.008 torr, and 21.01 g (i.e., 59.33% of the theoretical amount) of 6-methyl-8-(2-tetrahydrofuryl)-2-octanone, b.p. 99.5°–106.5°C/0.008 torr, the purity of which is 98% (as shown by gas chromatography).

Preparation of Methyl
3,7-Dimethyl-9-(2-tetrahydrofuryl-2-nonenoate
(COMPOUND Ia).

A mixture of 6-methyl-8-(2-tetrahydrofuryl)-2-octanone (2.17 g; 0.01 mol; purity, 98%), methoxycarbonylmethylenetriphenylphosphorane (5.02 g; 0.015 mol), absolute benzene (30 ml), and benzoic acid (0.99 g) is refluxed under argon for 22 hours and 30 minutes. The reaction mixture is then treated with additional amounts of the phosphorane (1.67 g; 0.005 mol), benzoic acid (0.33 g), and absolute benzene (10 ml), and refluxed for 24 hours and 30 minutes more. The additional treatment with the phosphorane, benzoic acid, and benzene is repeated once more and the final reaction mixture is refluxed for 30 hours and 30 minutes. The benzene is evaporated under diminished pressure and the residual oil is triturated repeatedly with light petroleum. The extracts are combined, washed successively with 2N sulfuric acid, water, 2N potassium hydrogen carbonate, water till neutral, and with saturated aqueous sodium chloride, dried over magnesium sulfate, and evaporated under diminished pressure. The residue is chromatographed on the partially deactivated (by the addition of 12% of water) silica gel (175 g; particle size, 60–120 micron) in 93:7 light petroleum-methyl acetate. The fractions which contain the pure product are combined, evaporated, and the residue is subjected to short-path distillation from a Hickman flask (glass wool).

Yield, 1.42 g (i.e., 52.91% of the theoretical amount) of methyl 3,7-dimethyl-9-(2-tetrahydrofuryl)-2-nonenoate (COMPOUND Ia), b.p. 120°–130°C/0.004 torr (bath temperature).

EXAMPLE 2

Preparation of Ethyl
3,7-Dimethyl-9-(2-tetrahydrofuryl)-2-noneoate
(COMPOUNDS Ib and Ic).

METHOD A.

A mixture of 6-methyl-8-(2-tetrahydrofuryl)-2-octanone (2.17 g; 0.01 mol; purity, 98%), ethoxycarbonylmethylenetriphenylphosphorane (5.22 g; 0.015 mol), absolute benzene (30 ml), and benzoic acid (0.99 g) is refluxed under argon for 22 hours and 30 minutes. The reaction mixture is then treated with additional amounts of the phosphorane (1.74 g; 0.005 mol), benzoic acid (0.30 g), and absolute benzene, and refluxed for 24 hours and 30 minutes more. The additional treatment with the phosphorane, benzoic acid, and benzene is repeated once more and the final reaction mixture is refluxed for 30 hours and 30 minutes. The benzene is then evaporated under diminished pressure and the residual oil is triturated repeatedly with light petroleum. The extracts are combined, washed successively with 2N sulfuric acid, water, 2N potassium hydrogen carbonate, and water till neutral, with saturated aqueous sodium chloride, dried over magnesium sulfate, and evaporated under diminished pressure. The residue is chromatographed on a column of partially deactivated (by the addition of 12% of water) silica gel (130 g; particle size, 30–60 micron) in 96:4 light petroleum-ethyl acetate. The fractions which contain the pure product are combined, evaporated, and the residue is subjected to short-path distillation from a Hickman flask packed with glass wool.

Yield, 1.60 g (i.e., 56.65% of the theoretical amount) of COMPOUND Ib, b.p. 125°C/0.004 torr – 135°C/0.003 torr (bath temperature).

METHOD B.

A solution of 6-methyl-8-(2-tetrahydrofuryl)-2-octanone (2.17 g; 0.01 mol; purity, 98%), diethyl ethoxycarbonylmethanephosphonate (2.47 g; 0.011 mol), and absolute ethanol (14 ml) is treated dropwise under stirring over 20 minutes in the atmosphere of argon with ethanolic sodium ethoxide (prepared from 0.24 g i.e. 0.011 gramatom of sodium and 6 ml of absolute ethanol). The reaction mixture is then stirred at room temperature for 10 hours and set aside for 48 hours. The solvent is evaporated under diminished pressure at room temperature, the residue is diluted with water, and exhaustively extracted with light petroleum. The extracts are combined, washed successively with water, 1N sulfuric acid, water, 1N potassium hydrogen carbonate, and water till neutral, with saturated aqueous sodium chloride, dried over magnesium sulfate, and evaporated under diminished pressure. The residue is chromatographed on a column of the partially deactivated (by the addition of 12% of water) silica gel (120 g; particle size, 60-120 micron) in 88:12 light petroleum-ether. The fractions which contain the pure product are combined, evaporated, and the residue is subjected to the short-path distillation from a Hickman flask packed with glass wool.

Yield, 2.36 g (i.e., 83.57% of the theoretical amount) of

COMPOUND Ic, b.p. 130°C/0.007 torr – 140°C/0.005 torr (bath temperature).

EXAMPLE 3

Preparation of Isopropyl 3,7-Dimethyl-9-(2-tetrahydrofuryl)-2-nonenoate (COMPOUND Id).

Diisopropyl isopropoxycarbonylmethanephosphonate (3.46 g; 0.013 mol) is added dropwise at room temperature over 10 minutes in the atmosphere of argon to a stirred suspension of sodium hydride (0.343 g; 0.01 mol; purity, 70%) in absolute 1,2-dimethoxyethane (20 ml). The resulting mixture is stirred at room temperature for 60 minutes and then treated dropwise over 10 minutes with 6-methyl-8-(2-tetrahydrofuryl)-2-octanone (2.17 g; 0.01 mol, 98% purity). The reaction mixture is heated for 2 hours under reflux condenser at 50°-60°C under continuous stirring, cooled down, poured into water preacidified with sulfuric acid, and extracted exhaustively with light petroleum. The extracts are combined, washed successively with water, 2N potassium hydrogen carbonate, water (till neutral), and saturated aqueous sodium chloride, dried over magnesium sulfate, and evaporated under diminished pressure. The residue is chromatographed on a column of the partially deactivated (by the addition of 12% of water) silica gel (165 g; particle size, 60–120 micron) in 88:12 light petroleum-ether. The fractions which contain the pure product are combined, evaporated, and the residue is subjected to shortpath distillation from a Hickman flask packed with glass wool.

Yield, 1.41 g (i.e., 47.56% of the theoretical amount) of isopropyl 3,7-dimethyl-9-(2-tetrahydrofuryl) -2-nonenoate (COMPOUND Id), b.p. 130°C/0.006 torr – 140°C/0.005 torr (bath temperature).

EXAMPLE 4

Preparation of the N-Ethylamide of 3,7-Dimethyl-9-(2-tetrahydrofuryl)-2-nonenoic Acid.

(COMPOUND Ie)

Diethyl N-ethylaminocarbonylmethanephosphonate (2.90 g; 0.013 mol) is added dropwise over 10 minutes at room temperature in the atmosphere of argon to a stirred suspension of 70% sodium hydride (0.343 g; 0.01 mol) in absolute 1,2-dimethoxyethane (20 ml) and the stirring is continued at room temperature for 60 minutes. 6-Methyl-8-(2-tetrahydrofuryl)-2-octanone (2.17 g; 0.01 mol of the 98% sample) is then added dropwise over 10 minutes and the reaction mixture is stirred at 50°–60°C under reflux condenser for 2 hours. After cooling, the reaction mixture is poured into water preacidified with sulfuric acid, and extracted exhaustively with light petroleum. The extracts are combined and washed successively with water, 2N potassium hydrogen carbonate, water till neutral, and saturated aqueous sodium chloride. The washed extracts are dried over magnesium sulfate and evaporated under diminished pressure. The residue is chromatographed on a column of partially deactivated silica gel (by the addition of 12% of water)(180 g; particle size, 60-120 micron) in 9:1 light petroleum-acetone. The fractions which contain the pure product are combined, evaporated, and the residue is subjected to short-parth distillation from a Hickman flask packed with glass wool.

Yield, 1.70 g (i.e., 60.4% of the theoretical amount) of 3,7-dimethyl-2-(2-tetrahydrofuryl)-2-nonenoic acid N-ethylamide (COMPOUND Ie), b.p. 175°–185°C/0.004 torr (bath temperature).

EXAMPLE 5

Preparation of the N,N-Diethylamide of 3,7-Dimethyl-9-(2-tetrahydrofuryl)-2-nonenoic Acid (COMPOUND If).

Diethyl N,N-diethylaminocarbonylmethanephosphonate (3.27 g; 0.013 mol) is added dropwise at room temperature over 10 minutes in the atmosphere of argon into a stirred suspension of sodium hydride (0.343 g; 0.01 mol of the 70% sample) in 20 ml of absolute 1,2-dimethoxyethane and the stirring is continued for additional 60 minutes at room temperature. 6-Methyl-8-(2-tetrahydrofuryl)-2-octanone (2.17 g; 0.01 mol of a 98% sample) is then added dropwise over 10 minutes and the reaction mixture is stirred at 50°–60°C under reflux condenser for 2 hours. After cooling, the mixture is poured into water preacidified with sulfuric acid and extracted exhaustively with light petroleum. The extracts are combined and washed successively with water, 2N potassium hydrogen carbonate, water till neutral, and saturated aqueous sodium chloride. The washed extracts are drained over magnesium sulfate and evaporated under diminished pressure. The residue is chromatographed on a column of the partially deactivated (by the addition of 12% of water) silica gel (170 g; particle size, 60–120 micron) in 92:8 light petroleum-acetone. The homogeneous fractions of the product are combined, evaporated, and the residue is subjected to the short-path distillation from a Hickman flask packed with glass wool.

Yield, 2.03 g (i.e., 65.6% of the theoretical amount) of 3,7-dimethyl-9-(2-tetrahydrofuryl)-2-nonenoic acid N,N-diethylamide, b.p. 175°C/0.004 torr – 185°C/0.003 torr (bath temperature).

EXAMPLE 6

Preparation of 3-Methyl-5-(2-tetrahydrofuryl)-1-pentanal.

A solution of ethyl 3-methyl-5-(2-tetrahydrofuryl)-1-pentanoate (13.19 g; 0.062 mol) in absolute ether (65 ml) is cooled down to −75°C (Dry-Ice/ethanol bath) and treated dropwise over 80 minutes under stirring in the atmosphere of argon with 9.23 ml of a 70% benzenic solution of bis(2-methoxyethoxy) sodium aluminium hydride previously diluted with 15 ml of absolute ether. The reaction mixture is stirred at −75°C for additional 24 hours and then decomposed by the dropwise addition of 1:5 aqueous sulfuric acid (62 ml) for 30 minutes. The cooling bath is removed and the stirring is continued until the temperature of the reaction mixture is 10°C. At this temperature, the mixture is diluted with water and the layers are separated. The aqueous layer is extracted with ether and the extract is combined with the original ethereal layer. The ethereal solution is washed successively with water, 1N potassium hydrogen carbonate, water till neutral, and saturated aqueous sodium chloride, dried over magnesium sulfate, and evaporated to afford 13.11 g of the residue. As shown by thin-layer chromatography on silica gel in 85:15 light petroleum-acetone, the required aldehyde is accompanied by some unreacted starting ester and the corresponding alcohol. Consequently, the crude residue is dissolved in about 100 ml of ether and the ethereal solution is stirred under argon for 16 hours with an aqueous solution of sodium pyrosulfite (15.76 g) in lukewarm water (29.7 ml) to deposite a precipitate of the aldehyde bisulfite. The precipitate is collected with suction, washed with a little ice-cold water and ether, and dried in an evacuated desiccator over silica gel and potassium hydroxide pellets.

Yield, 6.09 g (i.e., 36.2 of the theoretical amount) of the aldehyde bisulfite; usual work-up of the filtrate and washings affords 7.71 g of a mixture of the starting ester and of the corresponding alcohol.

The aldehyde bisulfite (6 g) is dissolved in water, the aqueous solution is overlaid with ether and treated with a solution of crystalline sodium carbonate (10 g) in water (70 ml). The whole is shaken and the layers are separated. The aqueous layer is extracted with two portions of ether. The ethereal extracts are combined with the original ethereal layer, washed with water till neutral and then with saturated aqueous sodium chloride, dried over magnesium sulfate, and evaporated under diminished pressure. The residue is distilled from a Hickman flask packed with glass wool to afford 3.58 g of 3-methyl-5-(2-tetrahydrofuryl)-1-pentanal, b.p. 120°–125°C/10.75 torr (bath temperature).

Preparation of Isopropyl 3,7-Dimethyl-9-(2-tetrahydrofuryl)-2,4-nonadienoate (COMPOUND Ig).

Diisopropyl isopropoxycarbonylmethanephosphonate (6.74 g; 0.022 mol) is added dropwise over 15 minutes in the atmosphere of argon to a stirred suspension of sodium hydride (0.96 g; 0.02 mol of the 50% mineral oil suspension) in absolute 1,2-dimethoxyethane (40 ml) and the whole is stirred at room temperature for 90 minutes. Because of no perceptible evolution of hydrogen (indicating the formation of the ylide), the reaction mixture is stirred at 60°–70°C for additional 60 minutes. After cooling down to the room temperature, the reaction mixture is treated dropwise over 10 minutes with 3-methyl-5-(2-tetrahydrofuryl)-1-pentanal (3.40 g; 0.02 mol). The stirring is continued at room temperature for one hour and an additional 1 hour at 60°–70°C. The reaction mixture is cooled down, poured into ice-cold water preacidified with acetic acid and extracted exhaustively with light petroleum. The extracts are combined, washed successively with water, 2N potassium hydrogen carbonate, water till neutral, and with saturated aqueous sodium chloride, dried over magnesium sulfate, and evaporated under diminished pressure to afford 5.97 g of the residue which is chromatographed on a column of a partially deactivated (by the addition of 12% of water) silica gel (265 g; particle size, 60–120 micron) in 96:4 light petroleum-acetone. Fractions containing the pure product are combined, evaporated under diminished pressure, and the residue is distilled from a Hickman flask packed with glass wool to afford 2.45 g (i.e., 41.6% of the theoretical amount) of the required isopropyl 3,7-dimethyl-9-(2-tetrahydrofuryl)-2,4-nonadienoate, b.p. 139°–148°C/0.004 torr (bath temperature).

We claim:

1. A compound selected from those of the following formula:

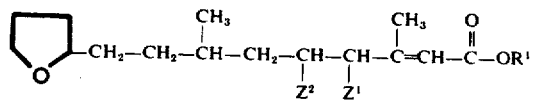

wherein,
each of $Z^1$ and $Z^2$ is hydrogen or $Z^1$ and $Z^2$ taken together form a carbon carbon bond; and
$R^1$ is hydrogen or alkyl group of one to five carbon atoms.

2. The compound of claim 1 wherein $R^1$ is ethyl and each of $Z^1$ and $Z^2$ is hydrogen.

3. The compound of claim 1 wherein $R^1$ is methyl and each of $Z^1$ and $Z^2$ is hydrogen.

4. The compound of claim 1 wherein $R^1$ is isopropyl and each of $Z^1$ and $Z^2$ is hydrogen.

5. A compound according to claim 1 wherein $R^1$ is alkyl and $Z^1$ and $Z^2$ taken together form a carbon-carbon bond.

6. The compound, isopropyl 3,7-dimethyl-9-(2-tetrahydrofuryl)-2,4-nonadienoate, according to claim 5.

* * * * *